Oct. 5, 1926.                                                       1,602,266
L. JARKOVSKY
SOLDERING BIT
Filed Dec. 5, 1924
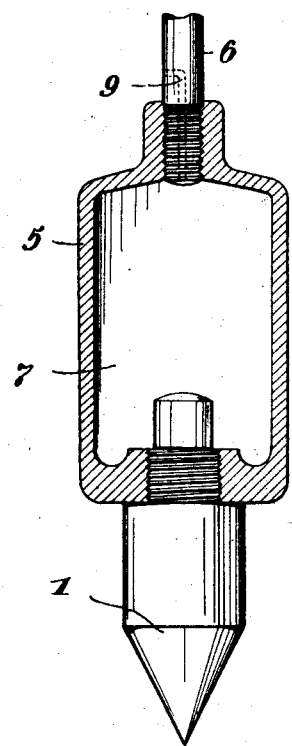
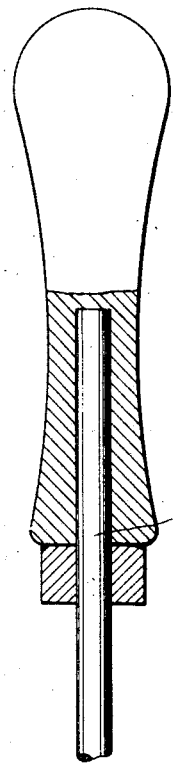
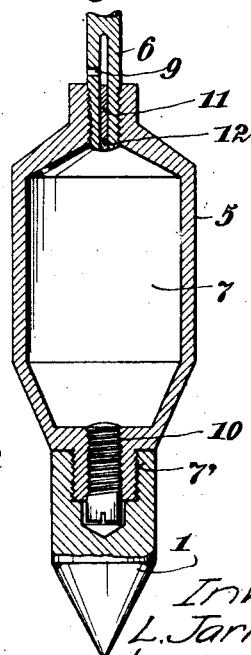
Fig. 1
Fig. 2
Inventor
L. Jarkovsky
by
Langner, Parry, Card & Langner
Att'ys Patented Oct. 5, 1926.

1,602,266

UNITED STATES PATENT OFFICE.

LADISLAUS JARKOVSKY, OF VIENNA. AUSTRIA, ASSIGNOR TO THE FIRM SPEZIAL-BRONZEN- UND METALLWALZWERK A. G., OF VIENNA, AUSTRIA.

SOLDERING BIT.

Application filed December 5, 1924, Serial No. 754,176, and in Austria December 11, 1923.

My invention relates to soldering bits having a hollow head containing one or more substances which melt on heating the head to the temperature required for soldering and are solidified when the soldering bit is in use and in so solidifying give off their latent melting heat. In the soldering bits as heretofore constructed the head is made of copper and this is found to be objectionable because the wall of the copper head is attacked or dissolved by the said substance or substances acting as heat accumulators, whereby the soldering bit is rapidly destroyed.

The object of my invention is to obviate this inconvenience and thereby to increase the life of the soldering bit.

With the object in view I make according to my present invention the hollow head of the soldering bit, that is to say the receptacle for the heat accumulating substances of a material indifferent to the said heat accumulating substances, that is to say I use for making the hollow head a substance not attacked by or not soluble in the heat accumulating substance.

Further objects and features will be fully explained later on and claimed in the appended claims.

In the annexed drawing Figs. 1 and 2 are longitudinal sections of two different embodiments of my invention.

1 is the copper tip of the soldering bit secured in the head 5 enclosing a hollow space 7 for receiving the heat accumulating substance, 6 is the handle of the soldering bit. The heat accumulating substance consists of a substance or a mixture of substances undergoing within the temperature limits of the soldering process a reversible change of state. For instance zinc may be used as a heat accumulating substance, but I prefer to use an alloy and more particularly the eutectic alloy of zinc and aluminium consisting of 95 parts by weight of zinc and 5 parts by weight of aluminium. That is, I use a zincous material, which term "zincous" designates zinc or an alloy of zinc. The melting temperature of this alloy is 380° centigrade, its specific heat is 0.117 and its latent melting heat is 30.5 calories. If this eutectic alloy be used as a heat accumulator the hollow head of the soldering bit is made of iron and preferably of cast iron as iron is not attacked by or soluble in this alloy. The life of the soldering bit is thus greatly increased.

In order to prevent the heat accumulating substance from coming into contact with the copper tip 1 which is liable to be rapidly destroyed by such contact, I prefer to secure the tip 1 on the head 5 in such a manner that this bit is entirely outside of the hollow space 7. This may be done as indicated in Fig. 2 by screwing the copper bit 1 on a screw threaded projection 7' of the head. If it be desired to provide an opening in the head opposite the handle 6 for facilitating the casting of the head, I close such opening by a plug 10 preferably a screw plug of iron, or other material indifferent to the heat accumulating substance.

In order to prevent the bursting of the hollow head if by accident the soldering bit were heated to a temperature beyond the vapourizing temperature of the heat accumulating substance I provide the handle 6 with a vent channel 9 establishing communication between the hollow space 7 of the head and the atmosphere and into this channel I insert a plug 11 of some suitable material say copper snugly fitting part of the channel 9 and protect such plug 11 from contact with the heat accumulating substance by a stopper 12 of some suitable refractory material, say asbestos at the inner end of the channel. Thus before the heat accumulating substance begins to vapourize to an appreciable extent, the plug 11 will melt and thus permit the vapours to escape.

As the outer end of the tip 1 is worn off in the use of the soldering bit the proper handling might be interfered with. In order to avoid this drawback I taper the end of the head 5 next to the tip 1, that is to say I make it frustroconical or frustropyramidal in shape as shown in Fig. 2 so that the tip 1 may be worn off to a great extent without interfering with the proper application of the soldering bit to the work.

What I claim is:—

1. A soldering bit, comprising, a hollow head, a heat accumulating substance within the head which changes its physical state during heating and cooling of the bit, the head being of iron and the heat accumulating substance being zincous.

2. A soldering bit, comprising, a hollow head, a heat accumulating substance within the head which changes its physical state during heating and cooling of the bit, the head being of iron and the heat accumulating substance being a zinc-aluminium alloy.

3. A soldering bit, comprising, a hollow head, a heat accumulating substance within the head which changes its physical state during heating and cooling of the bit, the head being of iron and the heat accumulating substance being a eutectic alloy of zinc and aluminium.

4. A soldering bit, comprising, a hollow head, a heat accumulating substance within the head which changes its physical state during heating and cooling of the bit, the head being of iron and the heat accumulating substance being zincous, a copper tip connected to the head and wholly out of contact with the heat accumulating substance.

5. A soldering bit, comprising, a hollow head, a heat accumulating substance within the head which changes its physical state during heating and cooling of the bit, the head being of iron and the heat accumulating substance being a zinc-aluminium alloy, a copper tip connected to the head and wholly out of contact with the heat accumulating substance.

6. A soldering bit, comprising, a hollow head, a heat accumulating substance within the head which changes it physical state during heating and cooling of the bit, the head being of iron and the heat accumulating substance being a eutectic alloy of zinc and aluminium, a copper tip connected to the head and wholly out of contact with the heat accumulating substance.

7. A soldering bit comprising a handle, a hollow head enclosing a heat accumulating substance fusible within the limiting temperatures of the soldering process, and a tip, the head being made of a material indifferent to the heat accumulating substance, the tip being screwed on a hollow projection projecting from the outside of the head opposite the handle and a plug of a material indifferent to the heat accumulating substance being inserted into the said hollow projection whereby this substance is prevented from penetrating into the hollow projection.

8. A soldering bit comprising a handle, a hollow head enclosing a heat accumulating substance fusible within the limit temperatures of the soldering process and a tip, the head being made of a material indifferent to the heat accumulating substance, the tip being screwed on a hollow projection projecting from the outside of the head opposite the handle and a plug of a channel being provided establishing communication between the interior of the head and the atmosphere and a plug being inserted into such channel which plug consists of a material fusible at a temperature lower than the vapourizing temperature of the said heat accumulating substance.

9. A soldering bit comprising a handle, a hollow head enclosing a heat accumulating substance fusible within the limit temperatures of the soldering process and a tip, the head being made of a material indifferent to the heat accumulating substance, the tip being screwed on a hollow projection projecting from the outside of the head opposite the handle and a plug of a channel being provided in the handle of such channel establishing communication between the interior of the head and the atmosphere and a plug being inserted into such channel which plug consists of a material fusible at a temperature lower than the vapourizing temperature of the said heat accumulating substance.

10. A soldering bit comprising a handle, a hollow head enclosing a heat accumulating substance fusible within the limit temperatures of the soldering process and a tip, the head being made of a material indifferent to the heat accumulating substance, the tip being screwed on a hollow projection projecting from the outside of the head opposite the handle and a plug of a channel being provided establishing communication between the interior of the head and the atmosphere and a plug being inserted into such channel which plug consists of a material fusible at a temperature lower than the vapourizing temperature of the said heat accumulating substance and a stopper of refractory material indifferent to the heat accumulating substance being inserted into the inner end of the said channel.

11. A soldering bit comprising a handle, a hollow head enclosing a heat accumulating substance fusible within the limit temperatures of the soldering process and a tip, the head being made of a material indifferent to the heat accumulating substance, the tip being screwed on a hollow projection projecting from the outside of the head opposite the handle and a plug of a channel being provided in the handle of such channel establishing communication between the interior of the head and the atmosphere and a plug being inserted into such channel which plug consists of a material fusible at a temperature lower than the vapourizing temperature of the said heat accumulating substance, and a stopper of refractory material indifferent to the heat accumulating substance being inserted into the inner end of the said channel.

12. A soldering bit comprising a handle, a hollow head enclosing a heat accumulating substance fusible within the limit temperatures of the soldering process and a tip, the head being made of a material indifferent to the heat accumulating substance, the tip being screwed on a hollow projection projecting from the outside of the head opposite the handle and a plug of a channel being provided in the handle of such channel establishing communication between the interior of the head and the atmosphere and a plug being inserted into such channel which plug consists of a material fusible at a temperature lower than the vapourizing temperature of the said heat accumulating substance, and a stopper of asbestos being inserted into the inner end of the said channel.

In testimony whereof I have affixed my signature.

ING. JARKOVSKY-LADISLAUS.